United States Patent
Kapavik

(10) Patent No.: US 12,446,686 B2
(45) Date of Patent: Oct. 21, 2025

(54) MEDIA HOLDER WITH ADJUSTABLE SUPPORT

(71) Applicant: Daniel Kapavik, Washington, DC (US)

(72) Inventor: Daniel Kapavik, Washington, DC (US)

( * ) Notice: Subject to any disclaimer, the term of this patent is extended or adjusted under 35 U.S.C. 154(b) by 236 days.

(21) Appl. No.: 18/232,412

(22) Filed: Aug. 10, 2023

(65) Prior Publication Data
US 2025/0049208 A1    Feb. 13, 2025

(51) Int. Cl.
*A47B 23/00* (2006.01)
*A45F 5/00* (2006.01)

(52) U.S. Cl.
CPC .............. *A47B 23/002* (2013.01); *A45F 5/00* (2013.01); *A45F 5/1525* (2025.01); *A47B 2230/0011* (2013.01)

(58) Field of Classification Search
CPC . A47B 23/002; A47B 2230/0011; A45F 5/00; A45F 5/1525
USPC .......................................................... 108/43
See application file for complete search history.

(56) References Cited

U.S. PATENT DOCUMENTS

| | | | |
|---|---|---|---|
| 2,670,260 A | 2/1954 | Watt | |
| 3,407,757 A | 10/1968 | Warner | |
| 5,255,612 A | 10/1993 | Anderson | |
| 5,263,423 A | 11/1993 | Anderson | |
| 5,355,811 A | 10/1994 | Brewer | |
| 5,615,817 A * | 4/1997 | Shevers, Jr. | A45F 5/00 |
| | | | 224/267 |
| 5,722,628 A * | 3/1998 | Menaged | A47B 23/043 |
| | | | 248/455 |
| 5,937,765 A | 8/1999 | Stirling | |
| 6,435,466 B1 * | 8/2002 | Adams | A47B 23/044 |
| | | | 248/455 |
| 6,496,360 B1 | 12/2002 | Cordes et al. | |
| 7,980,526 B2 * | 7/2011 | Lord | G06F 1/1632 |
| | | | 108/1 |
| 8,297,440 B2 * | 10/2012 | Schmidt | F16M 11/10 |
| | | | 206/320 |

(Continued)

OTHER PUBLICATIONS

AppStrap 5 Kneeboard, Amazon.com: AppStrap 5—fits most tablets + heavy-duty case (not included) : Electronics, known at least as early as Apr. 28, 2023, last viewed Aug. 22, 2023, 7 pgs.

(Continued)

*Primary Examiner* — Daniel J Troy
*Assistant Examiner* — Timothy M Ayres
(74) *Attorney, Agent, or Firm* — Womble Bond Dickinson (US) LLP

(57) ABSTRACT

The kneeboard includes a deck, a securement strap, and an adjustable bolster. The deck has a first side end, a second side end, a holding side, and a support side. The support side has a first part of a two-part fastening system disposed thereon. The securement strap is attached to the deck and is configured to secure the kneeboard to a limb of a user. The adjustable bolster is attached to the support side of the deck and has a first wing and a second wing. Each wing includes a second part of the two-part fastening system. Each wing has a flat configuration and a raised configuration. In the flat configuration the wing is engaged with the support side a minimum distance from a side end. In the raised configuration the wing is engaged with the support side and spaced apart from a side end greater than the minimum distance.

20 Claims, 12 Drawing Sheets

(56) References Cited

U.S. PATENT DOCUMENTS

| | | | | |
|---|---|---|---|---|
| 8,480,144 | B2* | 7/2013 | Potter | A45F 5/10 |
| | | | | 224/217 |
| 8,807,333 | B1* | 8/2014 | Cooper | A45C 13/34 |
| | | | | 206/320 |
| 8,955,815 | B2* | 2/2015 | White | F16M 13/00 |
| | | | | 206/320 |
| 9,372,507 | B2* | 6/2016 | Dekock | G06F 1/166 |
| 2001/0045500 | A1* | 11/2001 | Krug | F16M 11/041 |
| | | | | 248/459 |
| 2010/0236452 | A1* | 9/2010 | Ruddy | B43L 3/005 |
| | | | | 108/6 |
| 2016/0183667 | A1* | 6/2016 | MacColl | A45F 5/00 |
| | | | | 224/222 |
| 2025/0228362 | A1* | 7/2025 | Kapavik | A45F 5/00 |

OTHER PUBLICATIONS

Ltrop ESR Case, Amazon.com: ESR for iPad Mini 6 Case, iPad Mini 6th Generation Case(8.3 inch, 2021), Convenient Magnetic Attachment, Auto Sleep/Wake, Two-Way Stand, Supports Pencil 2, Slim Cover, Rebound Series, Black : Electronics, known at least as early as Apr. 28, 2023, last viewed Aug. 22, 2023, 10 pgs.

Sport's Flight Gear Kneeboard, Flight Gear iPad Bi-Fold Kneeboard (sportys.com), known at least as early as Apr. 28, 2023, last viewed Aug. 22, 2023, 4 pgs.

Flight Outfitters, Centerline Kneeboard, Centerline Kneeboard—Flight Outfitters, known at least as early as Apr. 28, 2023, last viewed Aug. 22, 2023, 7 pgs.

Sport's Flight Outfitters Flight Desk, Flight Outfitters iPad Flight Desk (sportys.com), known at least as early as Apr. 28, 2023, last viewed Aug. 22, 2023, 4 pgs.

Flyboys Classic Kneeboard, Amazon.com: FLYBOYS Classic Kneeboard—Clipboard & Pen Holder—for Professional Pilots, General Aviation—Blue : Electronics, known at least as early as Apr. 28, 2023, last viewed Aug. 22, 2023, 9 pgs.

Forceprotector Kneeboard, Amazon.com : Forceprotector Gear LLC FPG Kneeboard : Sports & Outdoors, known at least as early as Apr. 28, 2023, last viewed Aug. 22, 2023, 8 pgs.

Etsy MK3 Kneeboard, Ready to Ship Mk3 Black W/ Buckle Aviator Kneeboard Ipad—Etsy, known at least as early as Apr. 28, 2023, last viewed Aug. 22, 2023, 13 pgs.

MyGoFlight Kneeboard, Amazon.com: MyGoFlight iPad Pro 11" (Generation 1, 2, 3) Polycarbonate Pilot Kneeboard and Mountable Everyday Cooling Case—Compatible with MGF Yoke and Suction Cup Sport Mounts and Sport Adapters : Electronics, known at least as early as Apr. 28, 2023, last viewed Aug. 22, 2023, 8 pgs.

R Spider Wireless Kneeboard, Amazon.com: R Spider Wireless Pilot Kneeboard. Includes Aluminum Clipboard. Fits iPad Pro 9.7", 10.5", 11", iPad and iPad Air 1/2/3/4/5/6, and Any Other 9"-11" Tablets : Electronics, known at least as early as Apr. 28, 2023, last viewed Aug. 22, 2023, 8 pgs.

* cited by examiner

MEDIA HOLDER WITH ADJUSTABLE SUPPORT

BACKGROUND

1. Technical Field

The present disclosure relates generally to document and digital device holders, and more specifically, to kneeboards for documents or digital devices.

2. Discussion of Related Art

Military missions and emergency responses often lead to situations that require review of printed documents or electronic data. Often these missions occur in locations or under conditions that make review of documents or data difficult. These conditions are particularly prevalent for aviators, both military and commercial. Aircraft have a multitude of flight controls that a pilot operates simultaneously such as engine throttles, yoke controls, and foot pedals among various other instruments. Pilots continue to rely upon printed media or compact digital devices to provide information while operating an aircraft. The information may include navigational maps or weather charts which may be displayed as printed material or on tablet devices. The information necessary to carry out a flight mission should be accessible while multitasking under adverse conditions such as turbulent air or rough weather.

Several attempts have been made to develop products that hold documents and digital devices to allow for hands-free review. Document and digital device holders can be cumbersome to install in a vehicle and difficult to remove in the event of last-minute changes to mission plans.

SUMMARY

This disclosure relates generally to a kneeboard and other media holding devices for ground vehicle and aircraft operators. Pilots need a time and space conscience device to reliably hold media hands-free in any aircraft or ground circumstance.

In an aspect of the present disclosure, a kneeboard includes a deck, a securement strap, and an adjustable bolster. The deck has a first side end, a second side end opposite the first side end, a holding side, and a support side opposite the holding side. The support side has a first part of a two-part fastener system disposed on the support side. The support side is configured to support media. The securement strap is attached to the deck and is configured to secure the kneeboard to a limb of a user. The adjustable bolster is attached to the support side of the deck and includes a first wing and a second wing. The first wing and the second wing each include a second part of the two-part fastener system. Each wing has a flat configuration in which the second part of the wing system is engaged with the first part of the support side of the deck a minimum distance from the first side end or the second side end. Each wing has a raised configuration in which the second part of the wing is engaged with the first part of the support side of the deck and spaced apart from the first side end or the second side end a distance greater than the minimum distance.

In aspects, the first part of the two-part fastener system entirely covers the support side of the deck. The adjustable bolster may have a unitary construction and be attached to the deck by a central securement segment such that unattached segments of the adjustable bolster form the first wing and second wing. The first wing and the second wing may each extend outwardly from the central segment opposite one another. Each wing may terminate in an engagement portion including the second part of the two-part fastener system.

In certain aspects, the securement strap includes an eye strap and an anchor strap. The eye strap may define a plurality of eyes to selectively receive an anchor of the anchor strap. The anchor strap may be configured to adjustably secure the kneeboard to a limb of a user with the anchor received within an eye of the plurality of eyes.

In some aspects, the first wing and the second wing each comprise an attachment panel, a medial panel, and an engagement panel. The attachment panel may be secured to the deck. The medial panel may extend from the attachment panel. The engagement panel may include the second part of the two-part fastener system and extend from the medial panel. The attachment panel, the medial panel, and the engagement panel may be foldable relative to each other such that the adjustable bolster can transition between the flat configuration and the raised configuration.

In certain aspects, the holding side includes a non-slip surface and a plurality of retention members. The non-slip surface may entirely cover the holding side. The plurality of retention members may each be configured to receive a corner of a piece of media. The two-part fastener system may be a hook and loop fastener system. The first part or the second part may be a hook part and the other of the first part or the second part may be a loop part.

In another aspect of the present disclosure, a kneeboard includes a deck, a securement strap, and an adjustable bolster. The deck has a holding side and a support side opposite the holding side. The holding side is configured to hold media. The securement strap is configured to secure the kneeboard about a limb of a user. The adjustable bolster is attached to the support side of the deck and includes a pair of wings. The adjustable bolster has a flat configuration in which each wing is releasably secured to the support side of the deck substantially parallel to the support side. The adjustable bolster has a raised configuration in which each wing is releasably secured to the support side and configured to stabilize the kneeboard relative to the limb of the user.

In aspects, when the adjustable bolster is in the raised configuration each wing forms a substantially polygonal profile with the support side. In the raised configuration each wing may form a substantially triangular profile with the support side.

In particular aspects, the adjustable bolster has a unitary construction. The adjustable bolster may be attached to the deck by a central segment such that the unattached segments of the adjustable bolster form each wing of the pair of wings. In the raised configuration each wing of the pair of wings and the central segment may define a valley therebetween configured to receive a limb of a user therein. The adjustable bolster may have a first end and a second end opposite the first end. Each wing of the adjustable bolster may be configured to twist relative to the deck such that the valley is wider at the first end or the second end and narrower at the other of the first end or second end in the raised configuration.

In some aspects, the securement strap is moveable between a secured state and a bundled state. In the secured state the securement strap may be configured to wrap about a limb of the user and secure the kneeboard thereto. In the bundled state the securement strap may be wrapped about the deck and adjustable bolster.

In particular aspects, each wing includes an attachment edge and attaches to the support side of the deck along the respective attachment edge. In the flat configuration, each wing may be releasably secured to the support side of the deck a minimum distance from a central axis of the deck. In raised configuration, each wing may be releasably secured to the support side of the deck a distance greater than the minimum distance from the central axis and closer to a respective engagement edge than in the flat configuration.

In another aspect of the present disclosure, a media holder includes a deck and an adjustable bolster. The deck has a holding side and a support side opposite the holding side. The adjustable bolster is attached to the support side of the deck and includes a pair of wings each having a first peak. Each wing has a flat configuration in which the wing is secured to the support side of the deck such that the first peak is substantially in contact with the support side. Each wing has a raised configuration in which the wing is secured to the support side of the deck such that the first peak is spaced apart from the support side of the deck.

In aspects, the first peak of one wing of the pair of wings is spaced apart from the support side of the deck a different distance than the first peak of the other wing of the pair of wings in the raised configuration. A wing may have a first end including the first peak, a second end opposite the first end including a second peak, and a joint extending between the first end and the second end. The wing may be configured to twist relative to the deck along the joint such that the first peak is spaced apart a first distance from the support side and the second peak is spaced apart a second distance from the support side when the adjustable bolster is in the raised configuration. The pair of wings and the support side of the deck may define a valley therebetween configured to receive a limb of a user such that the media holder is stabilized relative thereto. The media holder may include a securement strap attached to the adjustable bolster at the first peak of each wing. The securement strap may be configured to secure the media holder to a limb of a user.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
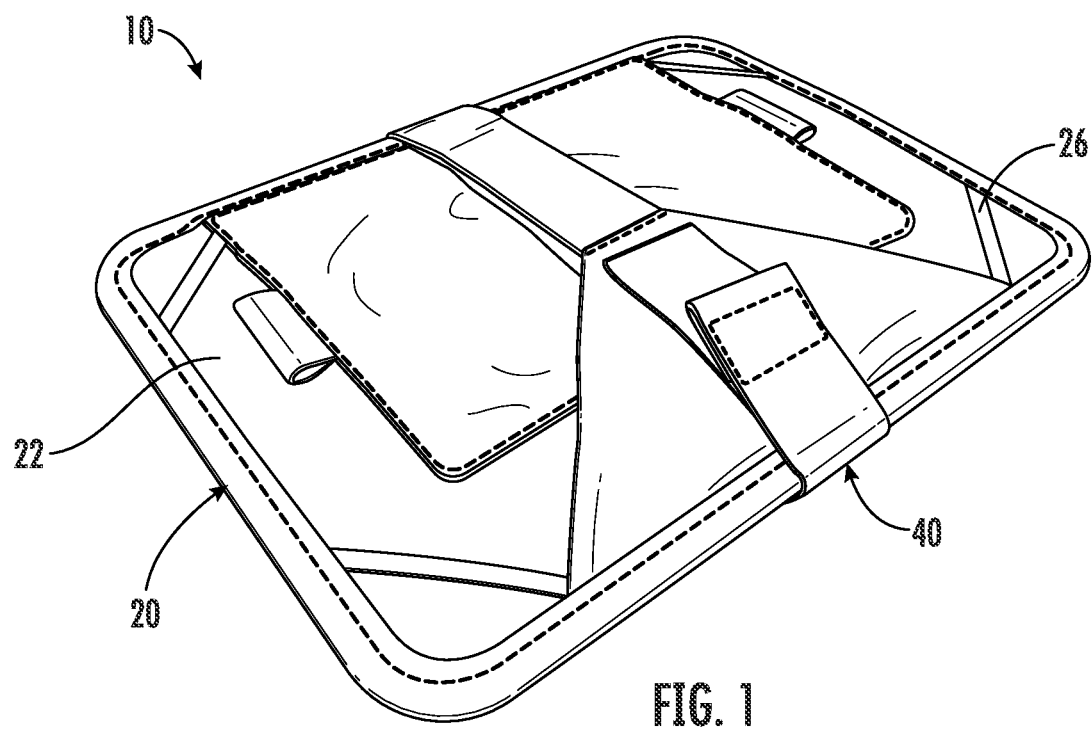
FIG. 1 is a perspective view of a kneeboard according to an embodiment of the present disclosure in a bundled state thereof.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Figure 2:
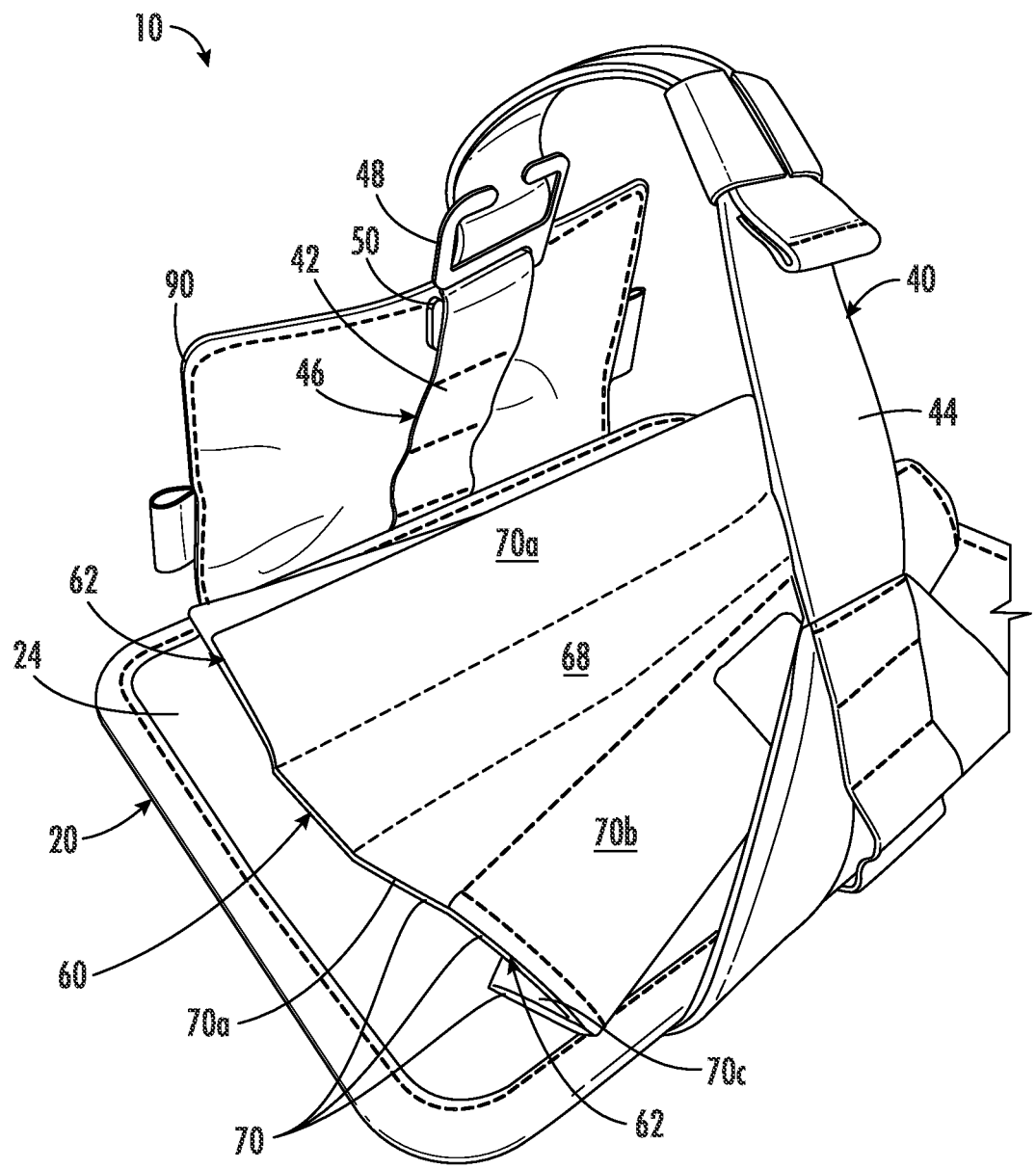
FIG. 2 is a bottom perspective view of the kneeboard of FIG. 1 in a secured configuration thereof.

Referring now to FIGS. 1 and 2, a media holder or kneeboard 10 includes a deck 20, a securement strap 40, and an adjustable bolster 60. The kneeboard 10 may transition between a bundled state (FIG. 1) and a secured state (FIG. 2). The kneeboard 10 is configured to retain media such as printed media, e.g., maps or notebooks, or digital devices, e.g., an iPad® or tablet, to the deck 20. In the bundled state the securement strap 40 wraps about the deck 20 and any media retained thereto. The bundled state may aid in retention of the media to the deck 20 or prevent snagging of the securement strap 40 on an environmental object. In the secured state, the kneeboard 10 may be secured to a limb or extremity, e.g., a leg or arm, of a user. The securement strap 40 wraps about the limb of the user such that media retained to the deck 20 is accessible to the user. The adjustable bolster 60 stabilizes the kneeboard 10 relative to the limb to provide the user with a suitable work surface, as detailed below.

Figure 3:
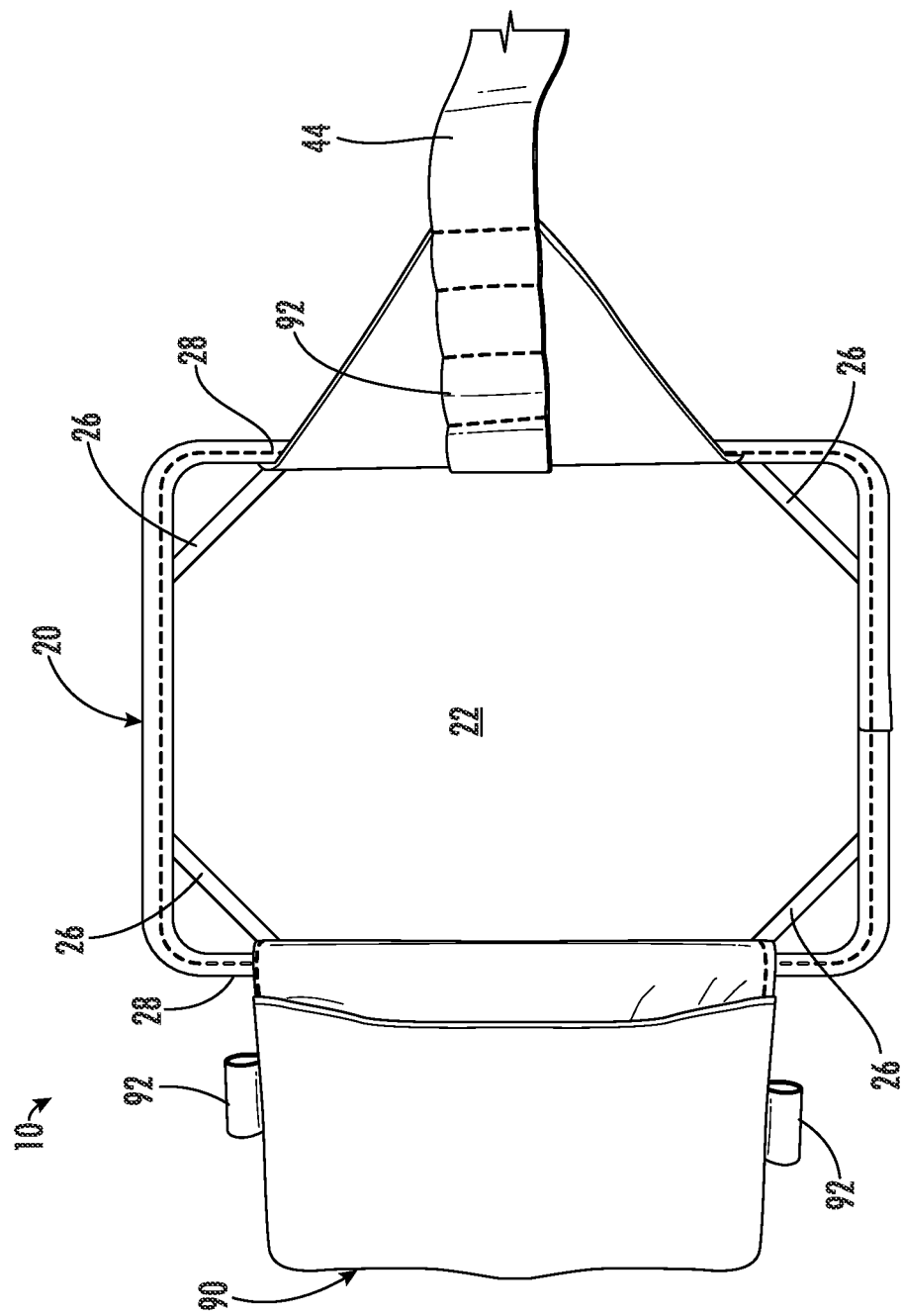
FIG. 3 is a top view of the kneeboard of FIG. 1 in an unbundled state thereof.
Figure 4:
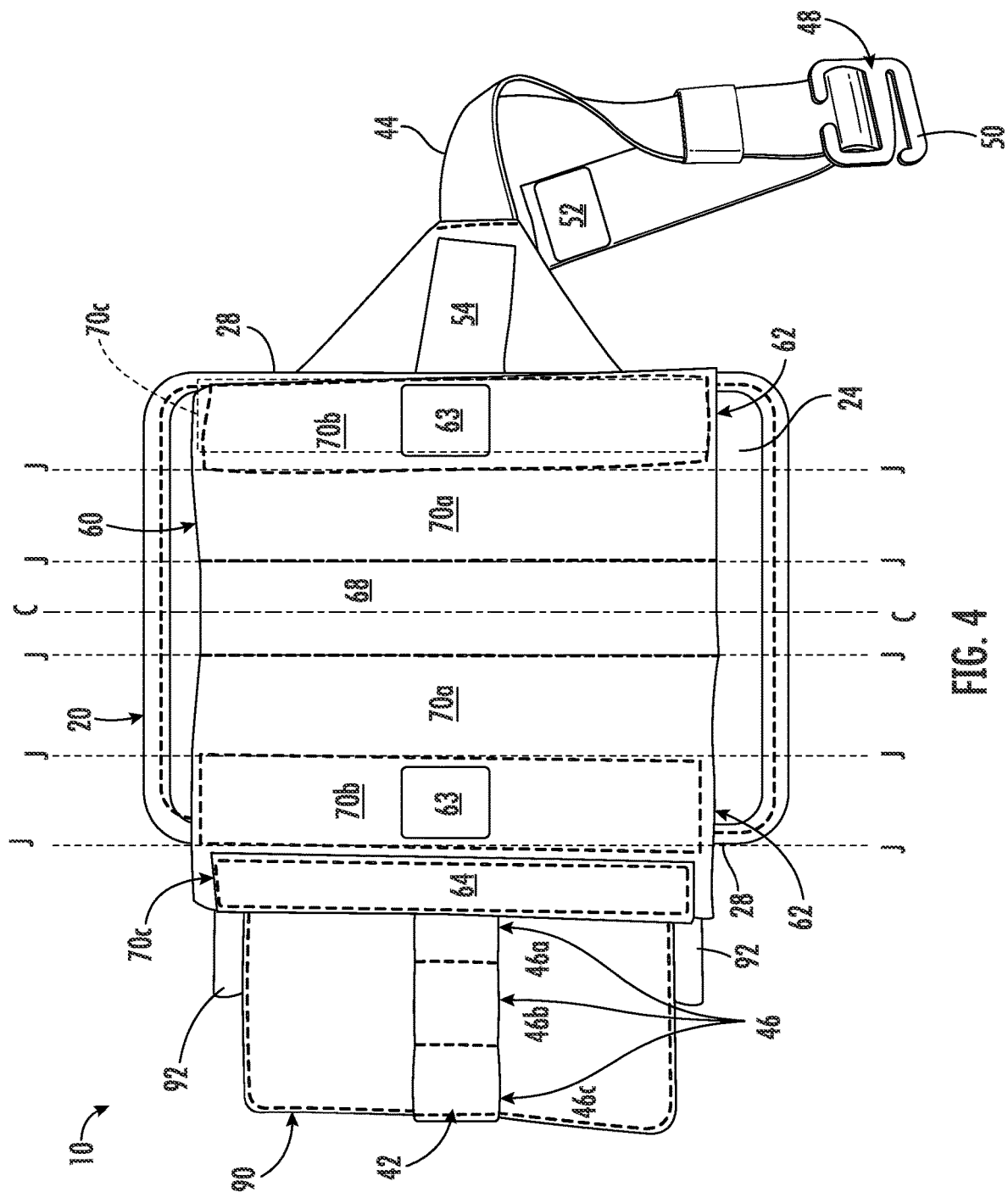
FIG. 4 is a bottom view of the kneeboard of FIG. 3 with one wing in a flat configuration and one wing disengaged from the support side.

With additional reference to FIGS. 3 and 4, the deck 20 has a holding side 22 and a support side 24. The holding side 22 retains media to the kneeboard 10. A non-slip material may cover the holding side 22 to resist shifting of media secured to the deck 20. The holding side 22 may be textured. In embodiments, the holding side 22 may have an inverse waffle texture with a plurality of raised squares separated by troughs. The holding side 22 may include a plurality of retentions members 26 to retain media to the deck 20. In some embodiments, the retention members 26 may be elastic straps.

The support side 24 includes the first part of a two-part fastener system. In certain embodiments, the first part of the two-part fastener system may be the loop part of a hook and loop fastener system. The first part of the two-part fastener system may cover the entire support side 24 of the deck 20. In some embodiments, the first part of the two-part fastener system may be disposed on select portions of the support side 24. For example, in certain embodiments, the first part of the two-part fastener system may be strips or patches located on the support side 24 corresponding to a flat configuration (FIG. 5) and a first raised position (FIG. 6) of the adjustable bolster 60, described in detail below. A first set of patches or strips may be located on the support side 24 adjacent to the side ends 28 of the deck 20, corresponding to the flat configuration, and a second set of patches or strips may be located inwardly from the side ends 28, corresponding to the first raised configuration.

The securement strap 40 secures the kneeboard 10 to a limb of a user. The securement strap 40 has an eye strap 42 and an anchor strap 44. The eye strap 42 and the anchor strap 44 each attach to the kneeboard 10 at opposite side ends 28 of the deck 20 and each extend a length outwardly from the deck 20. The eye strap 42 or the anchor strap 44 may attach to a respective side end 28 of the kneeboard 10 along the holding side 22 or the securement side 24 or from an edge of the side ends 28 between the holding side 22 and the securement side 24.

The anchor strap 44 includes an anchor 48 to couple the anchor strap 44 to the eye strap 42. In certain embodiments, the anchor 48 may have a hook 50 that engages the eye strap 42. The anchor strap 44 may be made of an elastic material. In particular embodiments, the anchor strap 44 may include a slide adjustor to adjust the length of the anchor strap 44 available to be disposed about the limb of a user. The anchor 48 and the slide adjustor may be monolithically formed such that the slide adjustor positions the anchor 48 and/or the hook 50 at a position along the length of the anchor strap 44. The anchor 48 may be laser cut from recycled material. The anchor strap 44 may include the first part of a two-part fastener system. The first part of the two-part fastener system may be positioned at an end portion 52 that is spaced a maximum distance along the anchor strap 44 from the attachment of the anchor strap 44 to the deck 20. The end portion 52 may engage a bundling segment 54 including the second part of the two-part fastening system when the kneeboard 10 is in the bundled state. In some embodiments, the bundling segment 54 may be included on the anchor strap 44 such that when the anchor strap 44 is wrapped about the deck 20 in the bundled state, the end portion 52 engages the bundling segment 54. The two-part fastener system of the end portion 52 and the bundling segment 54 may be a hook and loop system, a snap fit system, a buckle system, or the like.

The eye strap 42 defines a plurality of eyes 46 to receive the anchor 48. The plurality of eyes 46 are disposed along the length of the eye strap 42 such that the anchor 48, and/or the hook 50, may be received within an eye 46 at multiple points along the length of the eye strap 42. The eye strap 42 may be made of an inelastic material, e.g., webbing made of nylon or polyester. In the secured state the eye strap 42 and the anchor strap 44 wrap about a limb of a user such that the anchor 48 is received in an eye 46 to secure the kneeboard 10 to the limb.

The securement strap 40 is adjustable to selectively tighten or loosen the securement strap 40 about the limb of the user. In embodiments, the securement strap 40 may have two adjustment mechanisms. One of the two adjustment mechanisms may be considered a course adjustment and the second adjustment mechanism may be considered a fine adjustment. Inserting the anchor 48 into one of the eyes 46 along the length of the eye strap 42 may alternately tighten or loosen the securement strap 40 about the limb of the user. For example, inserting the anchor 48 in the eye 46*a* nearest the deck 20 along the length of the eye strap 42 may tighten the securement strap 40. Inserting the anchor 48 in the eye 46*c* may loosen the securement strap 40 about the limb compared to inserting the anchor 48 in the eye 46*a*. The eyes 46 are located at predetermined positions along the length of the eye strap 42 making adjustment by way of selecting an eye 46*a*, 46*b*, 46*c* a course adjustment mechanism. In certain embodiments, the eye strap 42 may include a single eye 46 configured to slide along the length of the eye strap 42. As detailed above, the anchor 48 may be moveable along the length of the anchor strap 44 to adjust the length of the anchor strap 44 available to wrap about the limb of a user. Positioning the anchor 48 at a position along the length of the anchor strap 44 closer to the end portion 52 will increase the operational length of the anchor strap 44 thereby loosening the securement strap 40. Positioning the anchor 48 closer to the deck 20 along the length of the anchor strap 44 will shorten the operational length of the anchor strap 44 thereby tightening the securement strap 40. The anchor 48 may be positioned at a desired point along the length of the anchor strap 44 making the adjustment by way of positioning the anchor 48 a fine adjustment. The combination of selecting an eye 46 of the eye strap 42 to receive the anchor 48 and positioning of the anchor 48 along the length of the anchor strap 44 makes the securement strap 40 quickly adjustable to meet the needs of most users. For example, the adjustment mechanisms may be used to compensate for additional or thick layers of clothing, or may compensate for items stored in pockets adding girth to the limb the kneeboard 10 is secured about.

Continuing to refer to FIG. 4, the adjustable bolster 60 is attached to the support side 24 of the deck 20 such that the adjustable bolster 60 stabilizes the kneeboard 10 relative to the limb of a user. The adjustable bolster 60 includes a pair of wings 62. Each wing 62 has an engagement portion 64 including the second part of the two-part fastener system of the support side 24. In some embodiments, the engagement portion 64 includes the hook part of a hook and loop fastener system. Each wing 62 of the pair of wings 62 may be formed from multiple panels 70, e.g., two panels, three panels, or more. For example, the panels 70 may include an attachment panel 70*a* configured to secure the wing 62 to the deck 20, a medial panel 70*b* extending from the attachment panel 70*a*, and an engagement panel 70*c* having the engagement portion 64 extending from the medial panel 70*b*. In certain embodiments, the engagement portion 64 covers or extends the length of the engagement panel 70*c*. In particular embodiments, the engagement portion 64 covers a segment of the engagement panel 70*c*, e.g., patches of hook fasteners disposed at opposite ends of the engagement panel 70*c*. In some embodiments, the two-part fastener system of the wings 62 and the support side 24 are cooperating magnets or snaps. The panels 70 may be ridged or semi-rigid and configured to bend, fold, pivot, or flex relative to each other along a joint J-J separating the panels 70*a*, 70*b*, and 70*c*. The adjustable bolster 60 may include padding for the comfort of the user. In some embodiments, the adjustable bolster 60 includes breathable material that allows for moisture to be wicked away from the user. For example, a 3D padded, mesh may be used to achieve both comfort and breathability.

In certain embodiments, each wing 62 may include a docking fastener 63. The docking fasteners 63 may allow for the kneeboard 10 to be docked when not in use. The docking fasteners 63 may mate with a dock placed on a wall to retain the kneeboard 10 thereto. For example, the dock may be placed on a wall or a surface within the cockpit of an aircraft to house the kneeboard 10 when not in use by a pilot. The docking fasteners 63 and the dock may be two halves of a cooperating hook and loop fastener system. Additionally or alternatively, the docking fasteners 63 may mate with the end portion 52 of the hook strap 44 to secure the knee board 10 in the bundled state. For example, the kneeboard 10 may have several layers of media increasing the overall thickness of the kneeboard 10. The docking fasteners 63 may mate with the end portion 52 where media secured to the kneeboard 10 restricts the end portion 52 from reaching and engaging the bundling segment 54.

Figure 5:
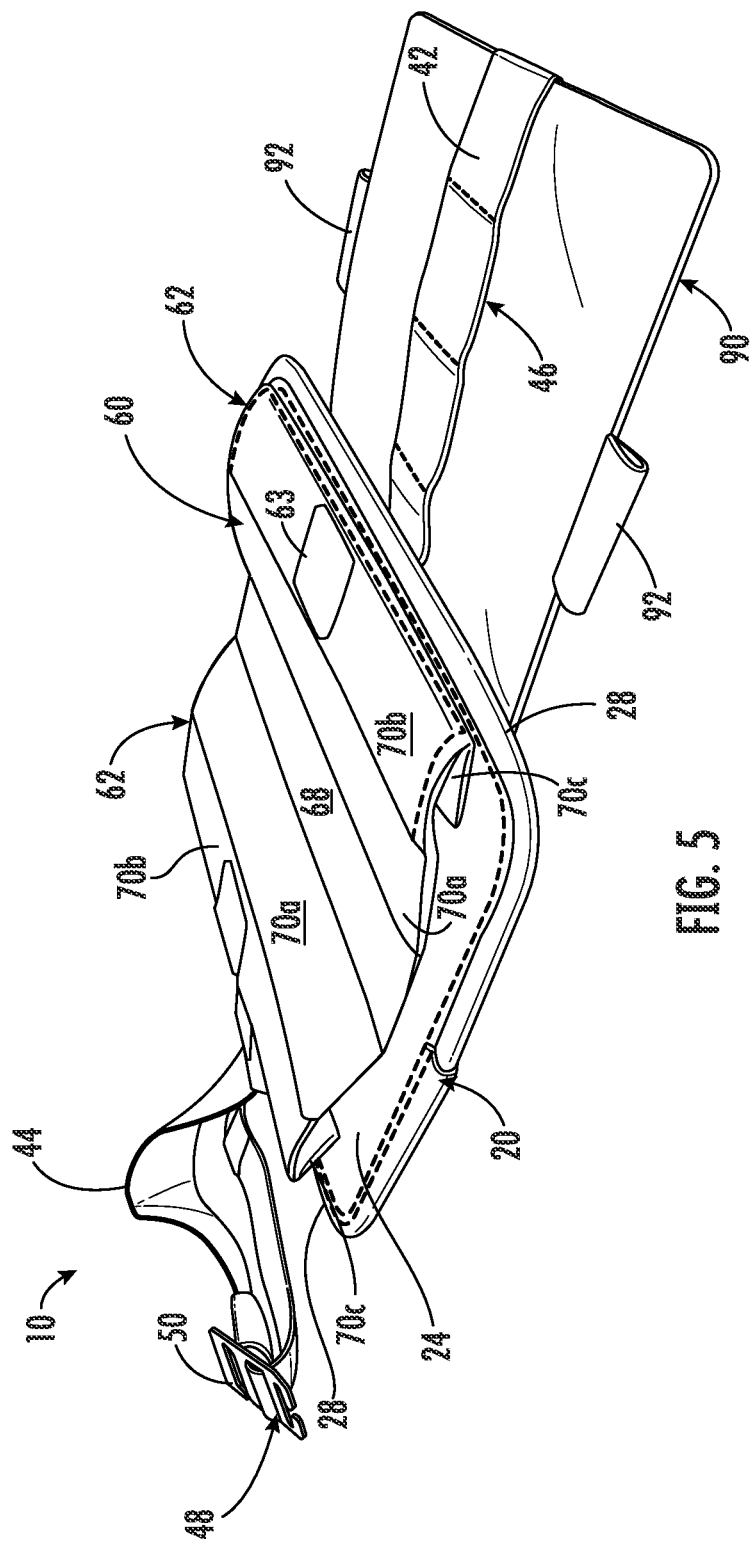
FIG. 5 is a perspective view of the kneeboard of FIG. 4 with an adjustable bolster in a flat configuration thereof.
Figure 6:
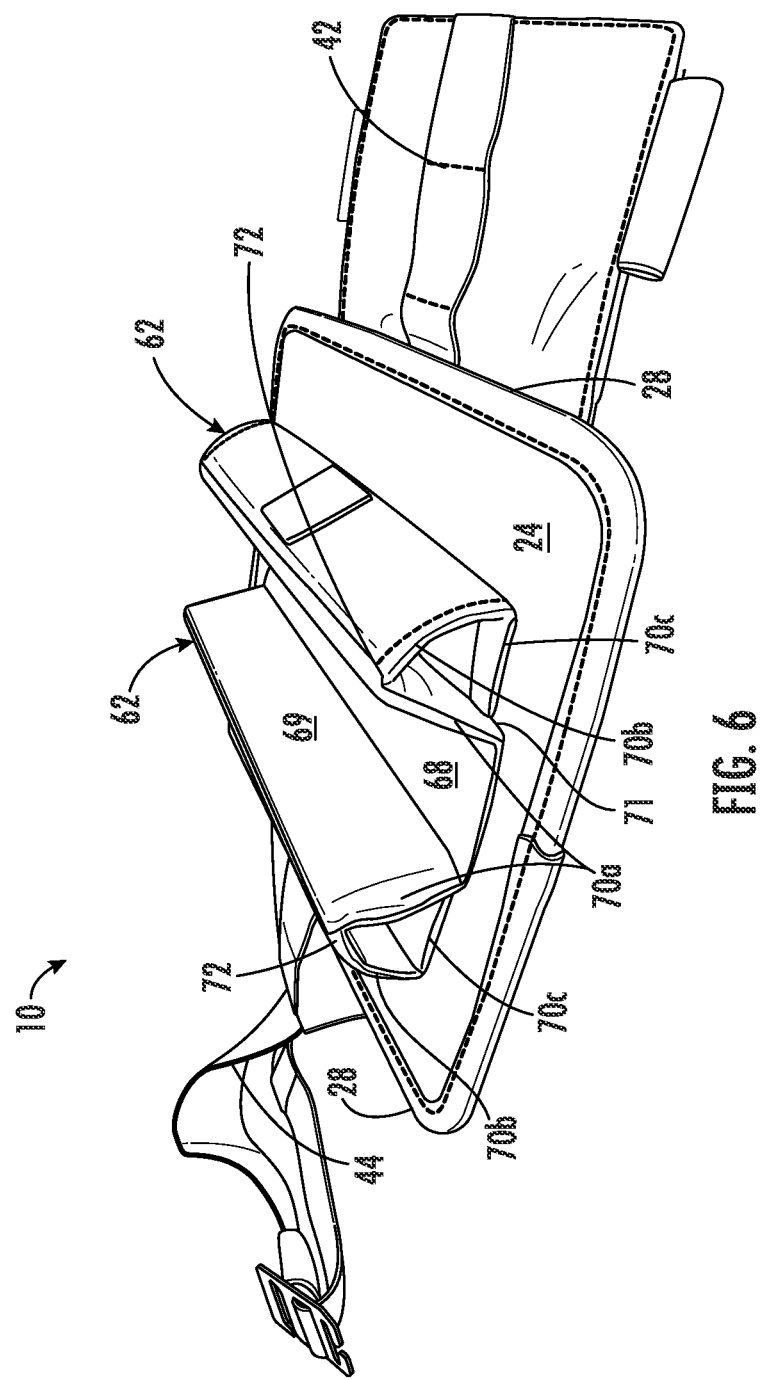
FIG. 6 is a perspective view of the kneeboard of FIG. 4 with the adjustable bolster in a first raised configuration thereof.

With additional reference to FIGS. 5 and 6, the adjustable bolster 60 has a flat configuration (FIG. 5) and a first raised configuration (FIG. 6). In the flat configuration, the pair of wings 62 are substantially parallel to the support side 24 of the deck 20 with the engagement portion 64 engaged with the support side 24 of the deck 20 immediately adjacent to the side ends 28 as shown in FIG. 5. In some embodiments, in the flat configuration the wings 62 may be engaged with the support side 24 a minimum distance from the side ends 28. The minimum distance is the shortest distance between a wing 62 engaged with the support side 24 and a side end 28. In the first raised configuration, the engagement portion 64 is engaged with the support side 24 such that each wing 62 may form a substantially triangular profile with the support side 24. In embodiments utilizing more than three panels 70, a different polygonal profile may be formed in the first raised configuration, e.g., a square or pentagon. In the first raised position the engagement panel 70c may engage the support side 24 immediately adjacent to an edge 71 of the attachment panel 70a that is secured to the support side 24 as shown in FIG. 6. The adjustable bolster 60 may have multiple raised configurations between the first raised configuration and the flat configuration. For example, the engagement panel 70c of each wing 62 may engage the support side 24 inwardly from the respective side end 28 but not immediately adjacent to the attachment panel 70a. In certain embodiments, in the first raised configuration the wings 62 may be engaged with the support side 24 a maximum distance from the side ends 28. The maximum distance is the greatest distance between a wing 62 engaged with the support side 24 and a side end 28. The wings 62 may be engaged with the support side 24 between the minimum distance and the maximum distance. In the first raised configuration, the pair of wings 62 and the support side 24 of the deck 20 may define a valley 69 therebetween. In embodiments, each wing 62 of the pair of wings 62 attaches to the support side 24 of the deck 20 near a central axis C-C of the deck 20 and extends outwardly in opposite directions from the central axis C-C toward the side ends 28. In certain embodiments, one of the engagement panels 70c may engage the support side 24 immediately adjacent to the edge 71 of the attachment panel 70a that is secured to the support side 24 and the other of the engagement panels 70c is spaced apart from the edge 71 of the attachment panel 70a that is secured to the support side 24.

In order to move the adjustable bolster 60 between the flat configuration and the first raised configuration, each wing 62 folds, bends, or pivots from the flat configuration. Each wing 62 may fold, bend, or pivot along joints J-J between adjacent panels 70. Moving the adjustable bolster 60 to the first raised configuration may cause the attachment panel 70a and the medial panel 70b to fold relative to one another such that a peak 72 projecting from the support side 24 is formed. In the flat configuration, the peak 72 may be substantially in contact with the support side 24 of the deck 20 as shown in FIG. 5. The peak 72 may be a point, edge, or surface of each wing 62 that is most distant from the support side 24 when the adjustable bolster 60 is in the first raised configuration, or one of the multiple raised configurations between the flat configuration and the first raised configuration. The distance the peak 72 projects from the support side 24 may be determined by how far inwardly from the side end 28 the engagement panel 70c engages the support side 24. The farther from the side end 28 the engagement panel 70c engages the support side 24 the greater the distance the peak 72 may project from the support side 24. In the first raised configuration the peak 72 may be in the range of 0.5 inches to 3.0 inches, e.g., 1.5 inches, from the support side 24 of the deck 20. As a wing 62 moves from the flat configuration to the first raised configuration the engagement panel 70c may move inwardly away from the side end 28 toward the central axis C-C. Each wing 62 may be adjustable independently of the other. One wing 62 may be in the first raised configuration and the other wing 62 may be in the flat configuration.

In particular embodiments, the adjustable bolster 60 has a unitary construction. A unitarily constructed adjustable bolster 60 is attached to the support side 24 of the deck 20 along a central segment 68 of the adjustable bolster 60. Each wing 62 of the pair of wings 62 is formed from the segments of the adjustable bolster 60 unattached to the support side 24. Each wing 62 extends outwardly from the central segment 68 opposite one another. The central segment 68 and the attachment panel 70a of each wing 62 define one of the joints J-J between each other, with the attachment panel 70a extending outwardly from the central segment 68. In the first raised configuration, the attachment panel 70a of each wing 62 and the central segment 68 define a valley 69 therebetween to receive the limb of a user. In some embodiments, the wings 62 and the support side 24 of the deck 20 define the valley 69 therebetween.

Figure 7:
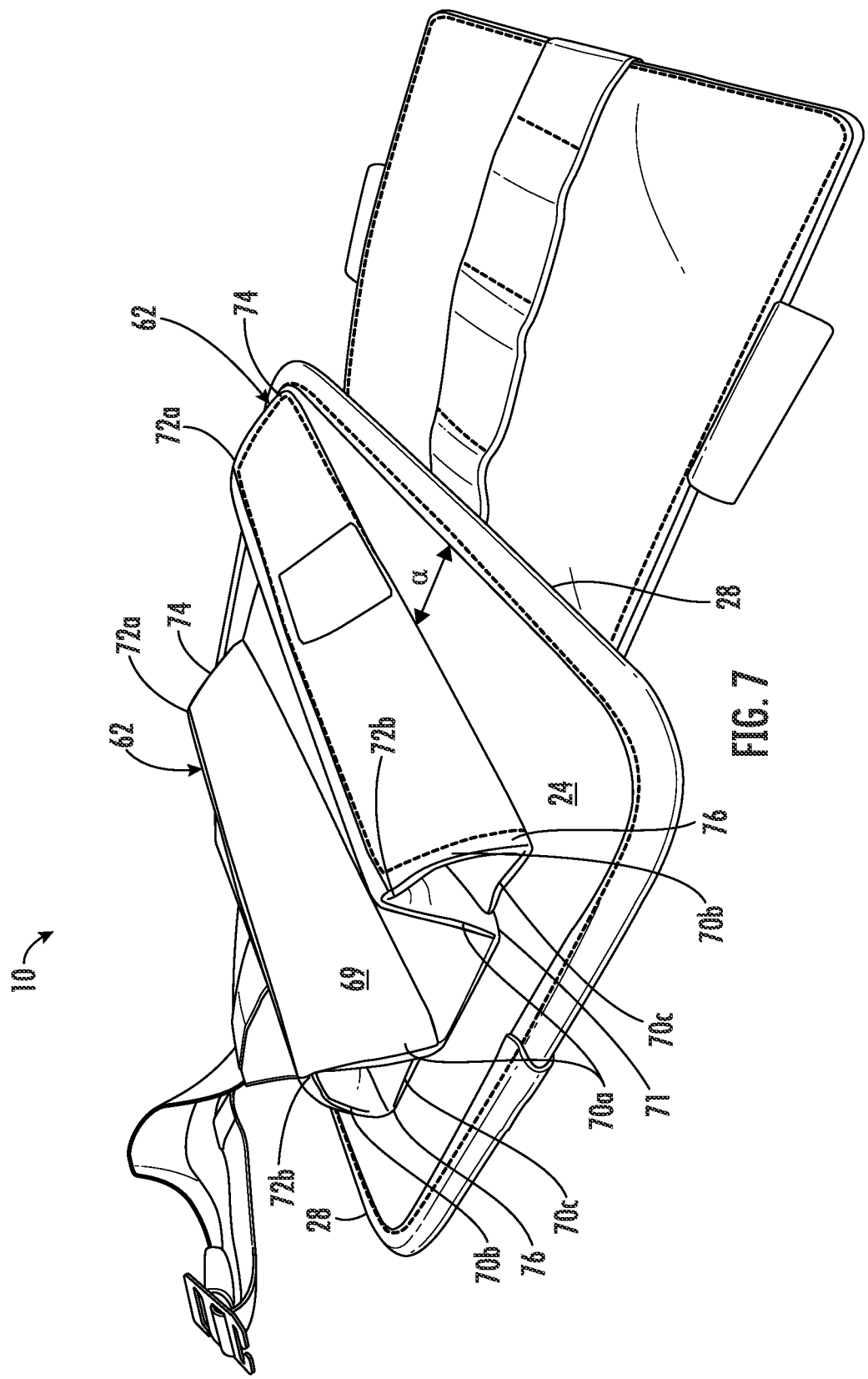
FIG. 7 is a perspective view of the kneeboard of FIG. 4 with the adjustable bolster in a second raised configuration thereof.

Referring to FIG. 7, the adjustable bolster 60 may have a raised configuration in which one or more of the wings 62 of the adjustable bolster 60 is twisted which will be referred to generally as the second raised configuration. The second raised configuration may allow the adjustable bolster 60 to better conform to the anatomy of a user. In the second raised configuration, a first end 74 of the wing 62 is engaged with the support side 24 adjacent to the side end 28 and a second end 76 of the wing 62 is engaged with the support side 24 inward of the side end 28 toward the central axis C-C. In the second raised configuration, the wing 62 has a first peak 72a at the first end 74 of the wing 62 and a second peak 72b at the second end 76 of the wing 62. The second peak 72b has a different height than the first peak 72a in the second raised configuration. The valley 69 defined between the wings 62 in the second raised configuration may be wider near the first end 74 and narrower near the second end 76, or vice versa, such that the valley 69 is tapered. The tapered shape of the valley 69 may conform to the taper of a limb of a user, e.g., the taper of the leg from knee to hip. In some embodiments, the width of the valley 69 may be defined between the peaks 72 of each wing 62 along the central axis C-C. Twisting the wing 62 causes the walls of the valley 69 formed by the attachment panel 70a of each wing 62 to have a different slope at the first end 74 and the second end 76 of the adjustable bolster 60. Where the attachment panel 70a has greater slope the valley 69 is narrower. Where the attachment panel 70a has a lesser slope the valley 69 is wider. The wings 62 may twist an angle α relative to the deck 20 in the second raised configuration. The angle α of the wings 62 relative to the deck 20 may be measured between the side end 28 of the deck 20 and the wing 62. The angle α may be in the range of 5 degrees to 45 degrees, e.g., 10 degrees. The bolsters in the second raised configuration may improve comfort of the user when the kneeboard 10 is secured to a limb of the user.

Figure 8:
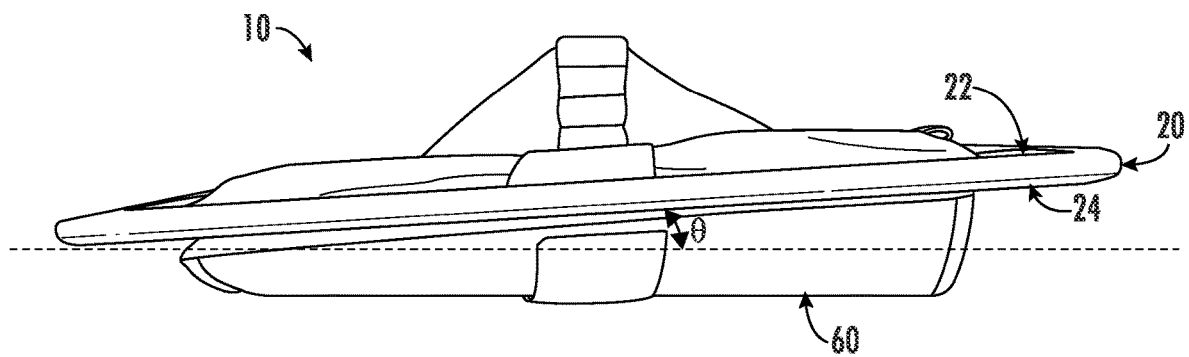
FIG. 8 is a side view of the kneeboard of FIG. 7.

With particular reference to FIG. 8, in certain embodiments the adjustable bolster 60 may have a raised position in which the deck 20 is angled relative to the limb of the user which will be referred to generally as the third raised configuration. The degree the deck 20 is angled is marked by an angle θ measured between the support side 24 of the deck 20 and a plane parallel to a surface supporting the kneeboard 10, e.g., a part of a limb of a user. The angle θ may be in the range of 3 degrees to 25 degrees, e.g., 8 degrees. The third raised configuration may improve the viewing angle of media retained to the deck 20. For example, the angle of the portion of the deck 20 adjacent a knee of the user may be elevated in relation to the portion of the deck 20 adjacent the hip of the user. The third raised configuration may provide an improved position for writing or typing media secured to the deck 20

Figure 9:
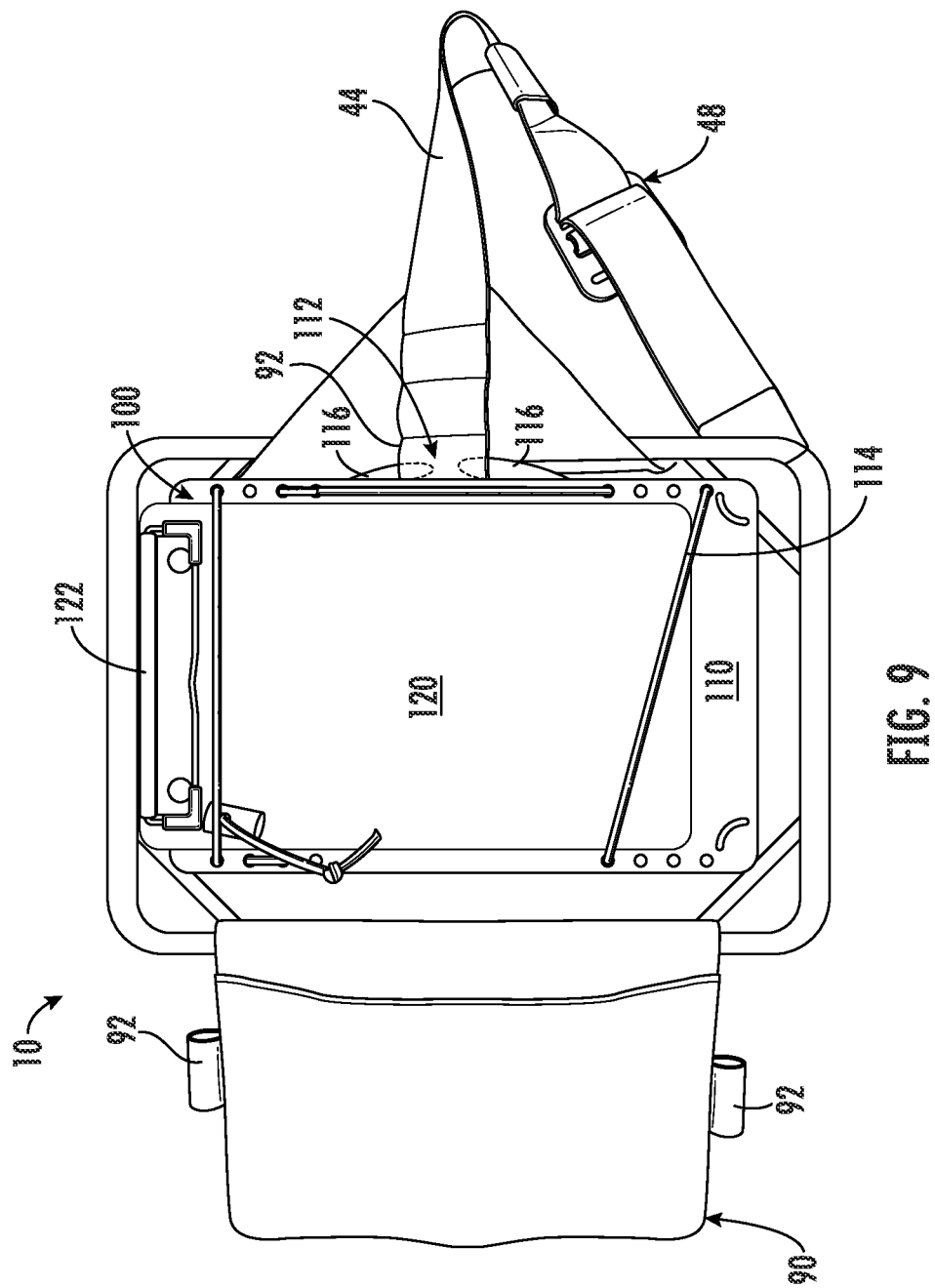
FIG. 9 is a top view of the kneeboard of FIG. 1 with a detachable clip board in a closed position thereof.
Figure 10:
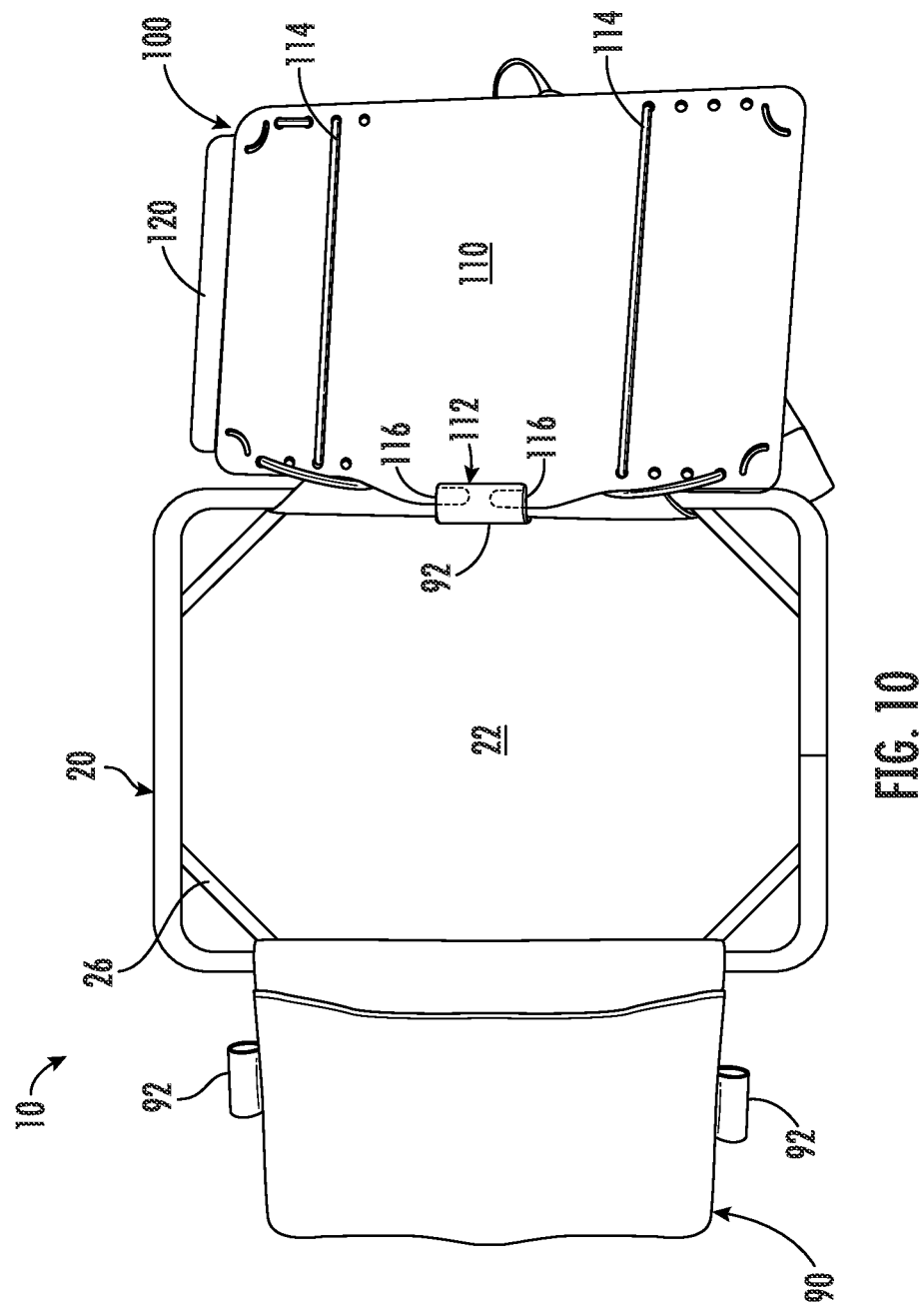
FIG. 10 is a top view of the kneeboard of FIG. 9 with the detachable clip board in an open position thereof.

With reference to FIGS. 9 and 10, the kneeboard 10 may include a pouch 90, a plurality of pen loops 92, and a detachable clip board 100. The pouch 90 may be attached to a side end 28 of the deck 20 and to the eye strap 42 such that the plurality of eyes 46 are defined between the eye strap 42 and the pouch 90. In the bundled state the pouch 90 may fold over top the holding side 22 of the deck 20 to cover the media retained to the deck 20. In the secured state the pouch 90 may be pulled taut by engagement of the eye strap 42 and the anchor strap 44 and positioned adjacent to the limb of the user such that the contents of the pouch 90 are readily accessible. The plurality of pen loops 92 may be attached to the pouch 90 or along an end of the deck 20. The pen loops 92 may be made of an elastic material to receive writing utensils of various diameters. The pouch 90 may be made of a mesh material. In some embodiments, the pouch 90 is a water resistant pouch.

The detachable clip board 100 includes a carrier board 110 and a writing board 120. The carrier board 110 secures the detachable clip board 100 to the kneeboard 10 such that the detachable clip board 100 folds over the holding side 22 to cover media retained to the deck 20. The carrier board 110 has an integrally formed clip 112 and a band 114. The clip 112 is formed as a pair of projections 116 that define a slot to receive the anchor strap 44 and allow the carrier board 110 to fold over the holding side 22. The band 114 retains the writing board 120 to the carrier board 110 such that the writing board 120 may be separated from the carrier board 110. The writing board 120 has a clamp 122 to retain media to the writing board 120. The band 114 may additionally aid in the retention of media to the writing board 120 when the writing board 120 is retained to the carrier board 110. In the bundled state, the securement strap 40 wraps about the detachable clip board 100 and retained the detachable clip board 100 snuggly against the holding side 22 of the deck 20. In the secured state, the detachable clip board 100 may be freely folded between a closed position in which the detachable clip board 100 covers the holding side 22 (FIG. 9) and an open position in which the detachable clip board 100 exposes the holding side 22 (FIG. 10).

Figure 11:
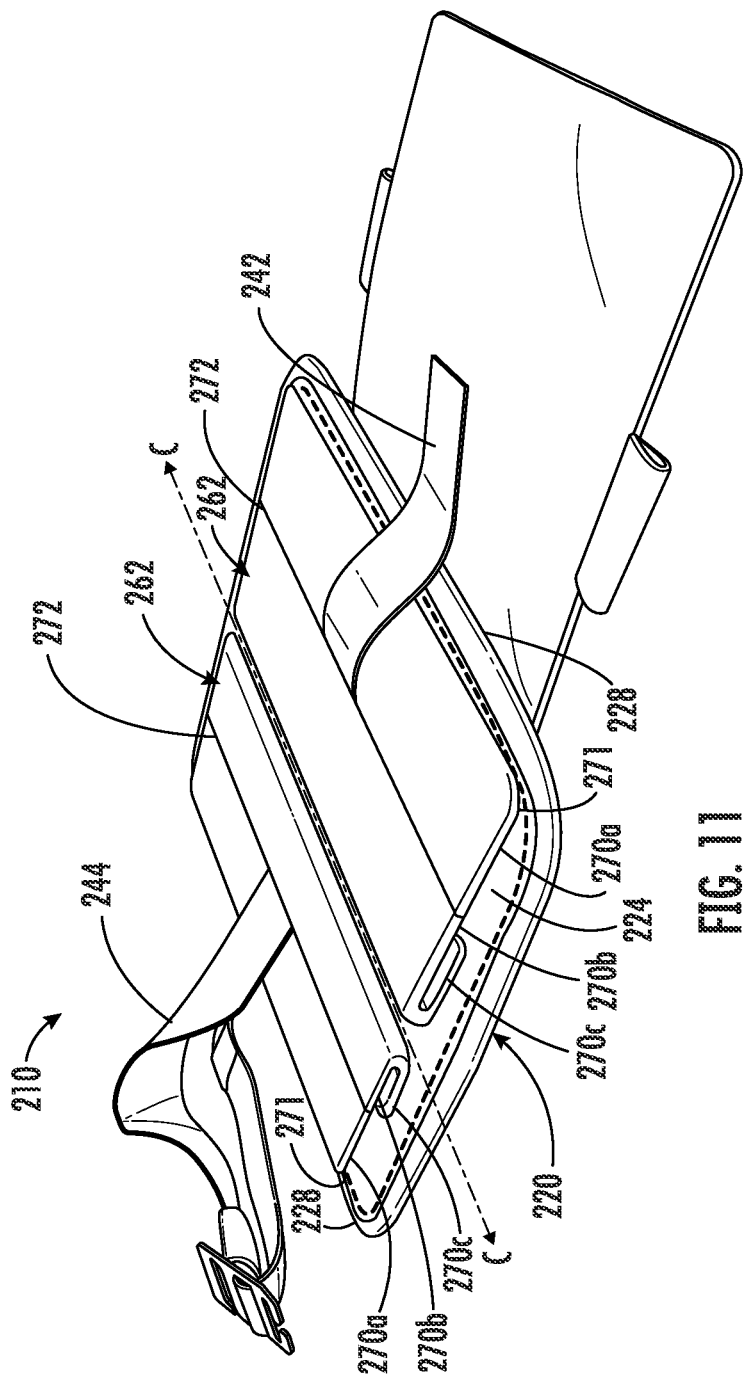
FIG. 11 is a perspective view of another kneeboard according to an embodiment of the present disclosure with an adjustable bolster in a flat configuration thereof.
Figure 12:
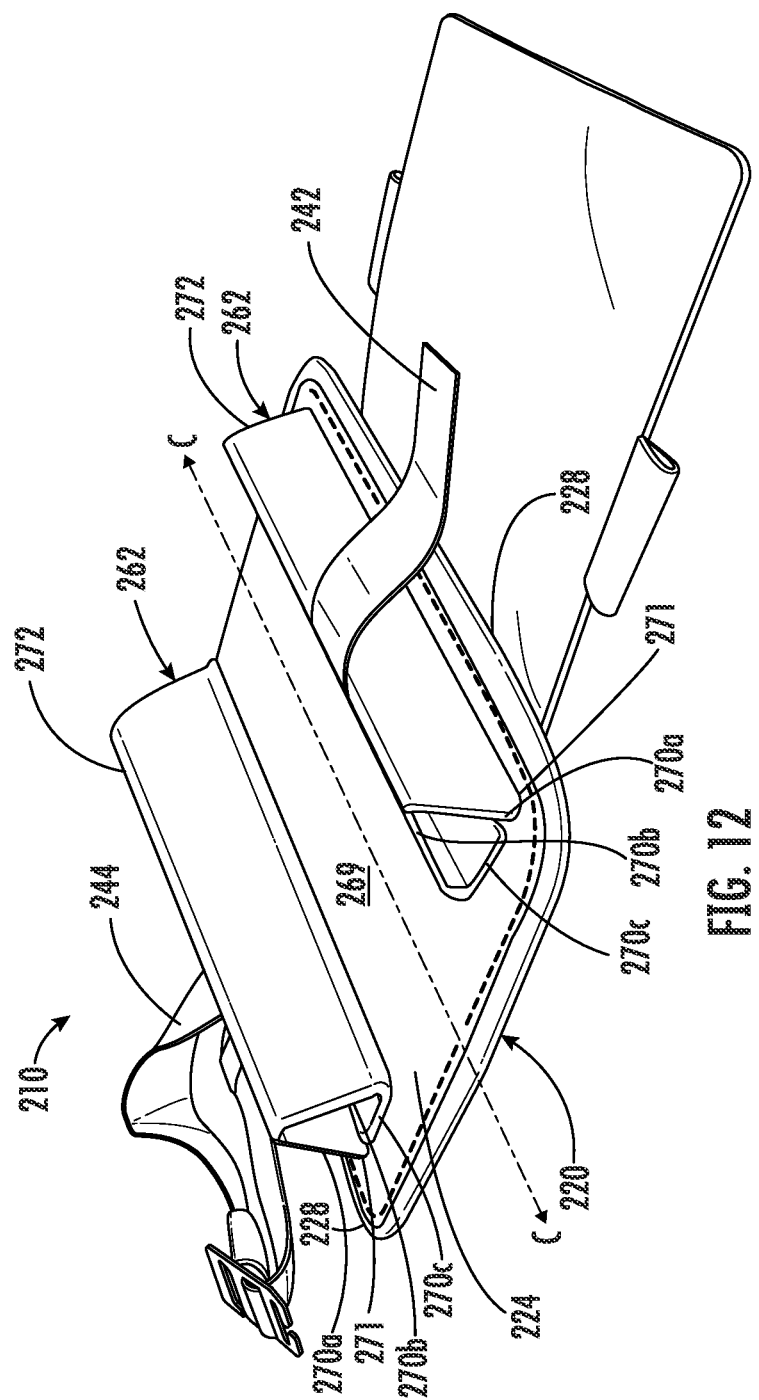
FIG. 12 is a perspective view of the kneeboard FIG. 11 with the adjustable bolster in a first raised configuration thereof.

Referring to FIGS. 11 and 12, another kneeboard 210 according to an embodiment of the present disclosure is shown. The kneeboard 210 is substantially similar to the kneeboard 10 with like elements represented with a similar label with a leading "2" placed at the start of the label of the similar element of the kneeboard 10. As such only the differences will be detailed herein for brevity.

Each wing 262 of the adjustable bolster 260 of the kneeboard 210 attaches to the support side 224 adjacent a respective side end 228 and extends inward towards the central axis C-C. In embodiments, each wing 262 attaches at a respective side end 228. In some embodiments, each wing 262 attaches to the support side 224 spaced-apart from a respective side end 228. In the flat configuration, the pair of wings 62 are substantially parallel to the support side 224 of the deck 220 with the engagement panel 270c engaged with the support side 224 at a minimum distance from the central axis C-C. The minimum distance may be the smallest distance between a wing 262 engaged with the support side 224 and the central axis C-C. In the first raised configuration as shown in FIG. 12, the engagement panel 270c may be engaged with the support side 224 a greater distance from the central axis C-C as compared to the flat configuration. In certain embodiments, in the first raised configuration, the wings 262 may be engaged with the support side 224 a maximum distance from the central axis C-C. The maximum distance may be the largest distance between a wing 262 engaged with the support side 24 and the central axis C-C. At the maximum distance, the wing 262 may engaged the support side 224 adjacent to the edge 271 of the attachment panel 270a that is secured to the support side 224. The wings 262 may be engaged with the support side 224 in a plurality of positions between the minimum distance and the maximum distance. In the first raised configuration, a wing 262 is engaged with the support side 224 such that each wing 262 may form a substantially polygonal profile, e.g., a triangular profile, with the support side 224. In the first raised configuration, the peak 272 of the wings 262 may be parallel to the edge 271. The wings 262 may have a second raised configuration in which the peak 272 of the wing 262 is askew from the edge 271.

The securement strap 240 attaches to the adjustable bolster 260. In certain embodiments, attaching the securement strap 240 to the adjustable bolster 260 may secure a deck 220 with dimensions substantially larger than the limb of user while minimizing potential deformation of the large deck 220. The hook strap 244 and the eye strap 242 may each attach to a respective wing 262 between the attachment panel 270a and the medial panel 270b. In the first raised position, the hook strap 244 and the eye strap 242 may extend from the peak 272. The securement strap 240 may be utilized with kneeboard 10. In such embodiments, the securement strap 240 is attached to the adjustable bolster 60 between the attachment panel 70a and the medial panel 70b. When secured to a limb of a user, the force exerted by the securement strap 240 on the deck 220 may be distributed by the adjustable bolster 260, may be more axially directed and less laterally directed, and may be centrally located along the width of the deck 220. A potential bending moment placed on the deck 220 by the securement strap 240 when in use may be minimized.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A kneeboard comprising:
a deck having a first side end, a second side end opposite the first side end, a holding side, and a support side opposite the holding side, the support side including a first part of a two-part fastener system disposed on the support side, the support side configured to support media, the deck defining an adjustment axis extending between the first side end and the second side end along the support side, the axis perpendicular to the first side end and the second side end;
a securement strap attached to the deck, the securement strap configured to secure the kneeboard to a limb of a user; and
an adjustable bolster attached to the support side of the deck, the adjustable bolster comprising a first wing and a second wing, the first wing and the second wing each including a second part of the two-part fastener system, the first wing having a flat configuration in which the second part of the two-part fastener of the first wing is engaged with the first part of the two-part fastener of the support side of the deck a first minimum distance measured in a direction parallel to the adjustment axis from the first side end, the first wing having a raised configuration in which the second part of the two-part fastener the first wing is engaged with the first part of the two-part fastener of the support side of the deck and spaced apart from the first side end a first raised distance that is greater than the first minimum distance measured in a direction parallel to the adjustment axis from the first side end, the second wing having a flat configuration in which the second part of the two-part fastener of the second wing is engaged with the first part of the two-part fastener of the support side of the deck a second minimum distance measured in a direction parallel to the adjustment axis from the second side end, the second wing having a raised configuration in which the second part of the two-part fastener the second wing is engaged with the first part of the two-part fastener of the support side of the deck and spaced apart from the second side end a second raised distance that is greater than the minimum distance measured in a direction parallel to the adjustment axis from the second side end.

2. The kneeboard according to claim 1, wherein the first part of the two-part fastener system entirely covers the support side of the deck.

3. The kneeboard according to claim 1, wherein the adjustable bolster has a unitary construction and is attached to the deck by a central segment of the adjustable bolster such that unattached segments of the adjustable bolster form the first wing and the second wing.

4. The kneeboard according to claim 3, wherein the first wing and the second wing each extend outwardly from the central segment opposite one another, each wing terminating in an engagement portion including the second part of the two-part fastener system.

5. The kneeboard according to claim 1, wherein the securement strap comprises an eye strap and an anchor strap, the eye strap defining a plurality of eyes to selectively receive an anchor of the anchor strap, the anchor strap configured to adjustably secure the kneeboard to a limb of a user with the anchor received within an eye of the plurality of eyes.

6. The kneeboard according claim 1, wherein the first wing and the second wing each comprise an attachment panel secured to the deck, a medial panel extending from the attachment panel, and an engagement panel including the second of the two-part fastener system extending from the medial panel, the attachment panel, the medial panel, and the engagement panel foldable relative to each other such that the adjustable bolster can transition between the flat configuration and the raised configuration.

7. The kneeboard according to claim 1, wherein the holding side comprises a non-slip surface entirely covering the holding side and a plurality of elastic retention members each configured to receive a corner of a piece of media.

8. The kneeboard according to claim 1, wherein the two-part fastener system is a hook and loop fastener system with one of the first part or the second part being a hook part and the other of the first part or the second part being a loop part.

9. The kneeboard according to claim 1, wherein each wing is substantially parallel to the support side of the deck when in the flat configuration.

10. The kneeboard according to claim 1, wherein the first raised distance and the second raised distance are equal.

11. A kneeboard comprising:
a deck having a holding side and a support side opposite the holding side, the holding side configured to hold media;
a securement strap configured to secure the kneeboard about a limb of a user; and
an adjustable bolster attached to the support side of the deck, the adjustable bolster comprising a pair of wings, the adjustable bolster having a flat configuration in which each wing is releasably secured to the support side of the deck substantially parallel to the support side, the adjustable bolster having a raised configuration in which each wing is releasably secured to the support side and configured to stabilize the kneeboard relative to the limb of the user, the pair of wings defining a valley therebetween when in the raised configuration, the adjustable bolster having a first end and a second end opposite the first end, each wing of the adjustable bolster configured to twist relative to the deck such that the valley is wider at the first end or the second end and narrower at the other of the first end or the second end in the raised configuration.

12. The kneeboard according to claim 11, wherein in the raised configuration, each wing forms a substantially polygonal profile with the support side.

13. The kneeboard according to claim 11, wherein in the raised configuration, each wing forms a substantially triangular profile with the support side.

14. The kneeboard according to claim 11, wherein the adjustable bolster has a unitary construction and is attached to the deck by a central segment of the adjustable bolster such that unattached segments of the adjustable bolster form each wing of the pair of wings.

15. The kneeboard according to claim 14, wherein in the raised configuration, each wing of the pair of wings and the central segment define the valley therebetween, the valley configured to receive a limb of a user therein.

16. The kneeboard according to claim 11, wherein the securement strap is moveable between a secured state in which the securement strap is configured to wrap about a limb of the user and secure the kneeboard thereto and a bundled state in which the securement strap is wrapped about the deck and the adjustable bolster.

17. The kneeboard according to claim 11, wherein each wing includes an attachment edge that attaches to the support side of the deck along the respective attachment edge such that in the flat configuration each wing is releasably secured to the support side of the deck a minimum distance from a central axis of the deck and in the raised configuration each wing is releasably secured to the support side of the deck a distance greater than the minimum distance from the central axis and closer to a respective engagement edge than in the flat configuration.

18. A media holder comprising:
a deck having a holding side and a support side opposite the holding side; and
an adjustable bolster attached to the support side of the deck, the adjustable bolster comprising a pair of wings each having a first peak, each wing having a flat configuration in which the wing is secured to the support side of the deck such that the first peak is substantially in contact with the support side, each wing having a raised configuration in which the wing is secured to the support side of the deck such that the first peak is spaced apart from the support side of the deck, each wing having a first end including the first peak, a second end opposite the first end including a second peak, and a joint extending between the first end and the second end, each wing configured to twist relative to the deck along the joint such that the first peak is spaced apart a first distance from the support side and the second peak is spaced apart a second distance from the support side when the adjustable bolster is in the raised configuration.

19. The media holder according to claim 18, wherein the first peak of one wing of the pair of wings is spaced apart from the support side of the deck a different distance than the first peak of the other wing of the pair of wings in the raised configuration.

20. The media holder according to claim 18, further comprising a securement strap attached to the adjustable bolster at the first peak of each wing and configured to secure the media holder to a limb of a user.

* * * * *